A. B. CADMAN.
VEHICLE COUPLING.
APPLICATION FILED JAN. 2, 1917.

1,340,521. Patented May 18, 1920.

Witnesses:
W. P. Kilroy
Harry R. White

Inventor:
Addi Benjamin Cadman
By Miller Chindahl Parker
Attys

UNITED STATES PATENT OFFICE.

ADDI BENJAMIN CADMAN, OF BELOIT, WISCONSIN, ASSIGNOR, BY MESNE ASSIGNMENTS, TO WARNER MANUFACTURING COMPANY, OF SOUTH BELOIT, ILLINOIS, A CORPORATION OF WISCONSIN.

VEHICLE-COUPLING.

1,340,521.    Specification of Letters Patent.    Patented May 18, 1920.

Application filed January 2, 1917. Serial No. 140,080.

*To all whom it may concern:*

Be it known that I, ADDI BENJAMIN CADMAN, a citizen of the United States, residing at Beloit, in the county of Rock and State of Wisconsin, have invented certain new and useful Improvements in Vehicle-Couplings, of which the following is a specification.

The general object of this invention is to produce a novel and improved coupling which is especially adapted for connecting a trailer to a motor vehicle or to another trailer, and the invention aims to provide a coupler of this character which has the combined attributes of security, rapidity in attachment and detachment, prevention of rattling, simplicity, strength and durability.

A further object is to provide a ball and socket coupling having a ball retainer which is mounted for pivotal movement and also for movement transverse to or play upon its axis, the coupling further having spring means tending to cause such transverse movement, and means for locking the retainer against pivotal movement without preventing such transverse movement.

Figure 1:
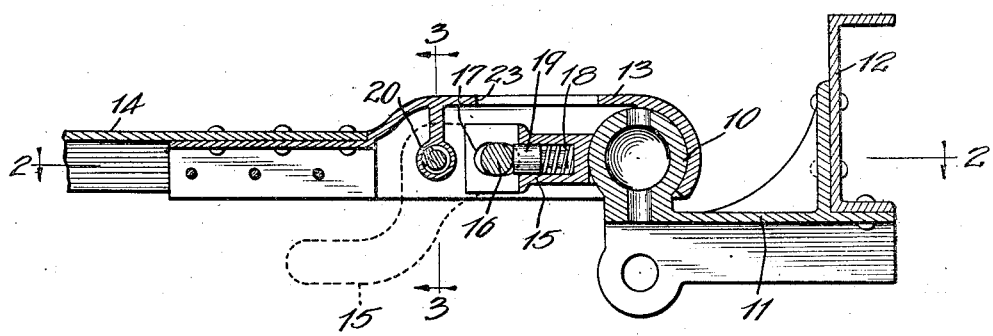
Figure 2:
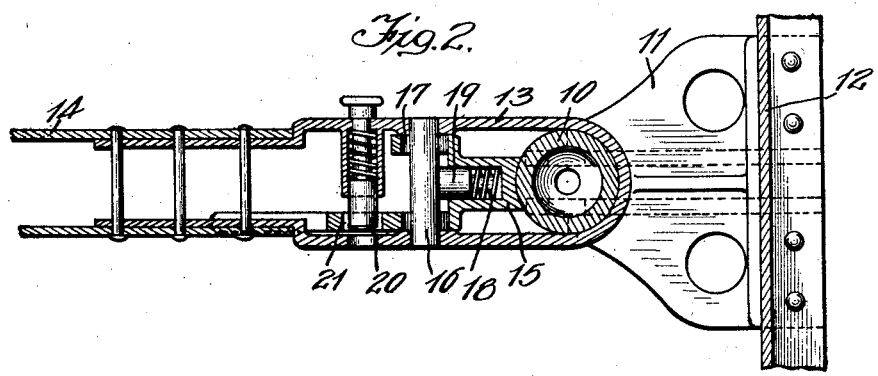
Figure 3:
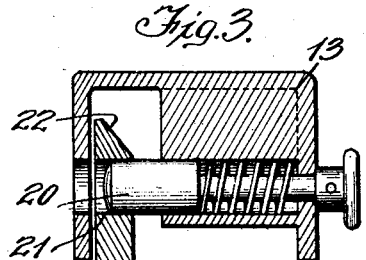
Figure 4:
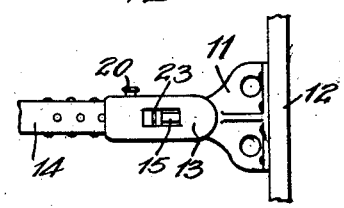

In the accompanying drawings, Figure 1 is a longitudinal vertical section through a coupling embodying the features of my invention. Fig. 2 is a horizontal section in the plane of line 2—2 of Fig. 1. Fig. 3 is a transverse section on line 3—3 of Fig. 1. Fig. 4 is a plan view on a reduced scale.

A coupling embodying my invention comprises a ball element and a socket element arranged to be mounted on two vehicles respectively and adapted to be readily associated and disassociated. In the exemplary embodiment shown in the drawings, the ball element comprises a ball proper 10 mounted on a bracket 11 which is arranged to be attached to a drawing vehicle such as a motor truck or automobile. 12 designates a fragment of a motor truck frame. The socket member 13 which is adapted to be mounted on the tongue 14 of a trailing vehicle is open at its lower side to receive the ball 10, the socket member having at its forward end a concave socket proper to fit the ball.

The ball is held in the socket by a retainer which is preferably in the form of a lever 15 extending generally parallel to the line of draft and being pivoted between its ends on a crosspin 16 fixed in the socket member. The opening 17 of the lever which receives said crosspin is elongated or enlarged so that the lever may have pivotal movement and also movement transverse to or play upon its axis. The forward end of the lever is arranged to abut against the ball 10 and may, if desired, be made concave to fit the ball. The portion of the lever rearward from its pivot is preferably curved downwardly so that it lies beneath the body portion of the socket and beneath the tongue 14 to provide a handle. In the present instance the intermediate portion of the lever is in the form of a yoke the sides of which are mounted on the pin 16, and one of these sides is extended to provide a handle. The shape of the lever may be varied to suit requirements.

The lever is normally urged toward the ball by spring means which, in the present instance, comprises a coiled compression spring 18 mounted in a bore in the lever and bearing at one end against a plunger 19 which is slidable in said bore, the other end of said plunger abutting against the crosspin 16. The spring 18 thus tends at all times to move the lever transverse to its axis so as to cause the lever to bear yieldingly against the ball.

The lever is arranged to be locked in its operative or ball-retaining position by means which, in the present instance, comprises a spring-pressed detent 20 mounted to slide transverse to the direction of swinging of the lever, one end of the detent being adapted to engage in an opening or slot 21 in the lever. Preferably either the lever or the detent is provided with a beveled face 22 so that as the lever is swung into operative position, the detent will automatically snap into the slot 21. When so engaged, the lever will be rigidly held or positively locked in its ball-retaining position. The lever is arranged to have play or movement with relation to the detent means so that the lever may be free to move under the influence of the spring 18, even though it is locked against pivotal movement. This effect is accomplished by making the slot 21 in the lever of elongated shape so that the detent 20 may play therein.

In operation, assuming the parts to be in the relation shown in Fig. 1, if it is desired to disconnect the coupler, the operator withdraws the detent 20 from the lever and pushes down on the rear end of the lever so as to swing the forward end thereof upwardly, an opening 23 in the top of the socket member being provided to accommodate the lever. The socket member may now be readily lifted out of engagement with the ball 10. To reëngage the coupling elements, the socket member is placed upon the ball, the rear end of the lever 15 is grasped and swung upwardly to engage the lever with the ball, and, in the latter part of the movement of the lever, the detent will automatically snap into its locking position. The lever will then be locked against pivotal movement but will be free to move transversely to its axis under the influence of the spring 18.

While I have herein shown and described in detail the preferred embodiment of my invention, I recognize that various modifications and equivalent structures will occur to persons skilled in the art, and I therefore, do not limit the invention to the exact disclosure. The scope of the invention is pointed out in the appended claims.

I claim as my invention:

1. Coupling means of the character described having, in combination, a ball member and a socket member arranged to be readily associated and disassociated, a horizontal pin stationarily mounted in the socket member, a lever having an opening between its ends receiving said pin for mounting the lever, the opening being larger than the pin to allow longitudinal play of the lever, the portion of the lever rearward of said pin being curved downwardly to provide a handle, a spring device carried by the lever and bearing against said pin, said spring device tending to urge the lever forwardly into engagement with the ball member, and a spring-pressed detent mounted to reciprocate horizontally and arranged to engage said lever to positively lock the latter in ball-retaining position, said lever having an elongated opening in which the end of the detent engages whereby to permit the movement of the lever caused by said spring device.

2. Coupling means of the character described having, in combination, a ball member and a socket member arranged to be readily associated and disassociated, said socket member having a socket proper in one end to receive the ball, a lever mounted on the socket member opposite to said socket proper, one end of said lever being arranged to bear against the ball for retaining the latter in the socket, said lever having loose longitudinal play on its mounting, spring means acting on the lever and urging the same toward the ball, the portion of the lever opposite to the ball-engaging portion curving downwardly to provide a handle, and spring-detent means mounted on the socket member and arranged to engage said lever for holding the latter in ball-retaining position, said lever having loose play relative to said detent means to permit movement of the lever by said spring means.

3. Coupling means of the character described having, in combination, a ball member and a socket member arranged to be readily associated and disassociated, a ball-retainer mounted on the socket member and arranged to engage the ball, said retainer having loose play in its mounting, spring means acting on the retainer to urge it toward the ball, and spring-detent means mounted on the socket and arranged to positively lock the retainer in operative position, said retainer having loose play with reference to said detent means so as to allow the spring-caused movement of the retainer.

4. Coupling means of the character described comprising a ball member and a socket member arranged to be readily associated and disassociated, a lever mounted on the socket member for pivotal movement and also for movement transverse to its axis, spring means urging said lever in such transverse movement for yieldably pressing the ball, and means for positively locking said lever against pivotal movement on said axis but allowing such spring caused movement.

5. Coupling means of the character described having, in combination, a ball member and a socket member arranged to be readily associated and disassociated, a lever extending generally parallel to the line of draft and pivoted on the socket member on a transverse axis between the ends of the lever, the mounting of the lever being arranged to allow movement thereof transverse to its axis, one end of the lever being arranged to engage the ball member, the opposite end of the lever being adapted to be grasped in the hand, spring means tending to move the lever transversely to its axis and cause the lever to yieldingly engage the ball, and means for locking the lever to the socket to prevent pivotal movement of the lever but allow said spring-caused movement.

6. A coupling of the character described having, in combination, a ball and a socket arranged to be disengageably associated, ball-retaining means arranged to hold the ball in the socket under yielding pressure, said retaining means including a lever extending in a direction from front to rear and pivoted between its ends on the socket, the front end of the lever being arranged to hold the ball in its socket and the rear end of the lever at the opposite side of its pivot extending angularly downward and rearward out of alinement with the front end and into position beneath the coupling means, and means for positively locking said lever in its operative position.

7. A coupling of the character described having, in combination, a ball element and a socket element arranged to be readily associated and disassociated, a lever extending in the general direction of the line of draft through the coupling and pivoted between its ends on the socket element on an axis extending transverse to the line of draft, one end of said lever being arranged to retain the ball in place and the end of the lever at the opposite side of its pivot extending angularly out of alinement with the first-mentioned end and into position to be conveniently grasped by the operator in swinging the lever, means for locking said lever in its ball-retaining position, and means for effecting yielding pressure upon the ball.

8. A coupler comprising, in combination, an up-standing ball, a socket portion open at its lower side to admit said ball and having a socket proper in its forward end to fit the ball, and a ball-retainer mounted on said socket portion and arranged to have a sliding movement with relation thereto in a direction toward and away from said socket proper.

9. A coupler comprising, in combination, an upstanding ball, a socket portion having top and side walls and open at its lower side to admit said ball and having a socket proper at its forward end to fit the ball, and a ball retainer pivoted between its ends on said socket portion, the forward end of the retainer being adapted to operatively engage the ball and the other end extending angularly downwardly out of alinement with the forward end and into position to be conveniently grasped by the operator, the upper side of the socket portion being constructed to permit of the upward movement of the forward end of the retainer to a point above the ball.

In testimony whereof I have hereunto set my hand.

ADDI BENJAMIN CADMAN.